United States Patent
Collard

(10) Patent No.: US 7,206,920 B2
(45) Date of Patent: Apr. 17, 2007

(54) MIN/MAX VALUE VALIDATION BY REPEATED PARALLEL COMPARISON OF THE VALUE WITH MULTIPLE ELEMENTS OF A SET OF DATA ELEMENTS

(75) Inventor: Jean-Francois C. Collard, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/302,908

(22) Filed: Dec. 13, 2005

(65) Prior Publication Data

US 2006/0095425 A1    May 4, 2006

Related U.S. Application Data

(63) Continuation of application No. 10/426,052, filed on Apr. 28, 2003, now abandoned.

(51) Int. Cl.
*G06F 15/80* (2006.01)

(52) U.S. Cl. ............................. 712/9; 708/207; 712/22; 712/222

(58) Field of Classification Search ..................... None
See application file for complete search history.

(56) References Cited

U.S. PATENT DOCUMENTS

| | | | |
|---|---|---|---|
| 4,896,133 A | 1/1990 | Methvin et al. | 340/146.2 |
| 5,537,562 A * | 7/1996 | Gallup et al. | 712/234 |
| 5,838,984 A * | 11/1998 | Nguyen et al. | 712/5 |
| 6,006,315 A * | 12/1999 | Park | 712/7 |
| 6,128,614 A | 10/2000 | Mennemeier et al. | 707/7 |
| 6,697,064 B1* | 2/2004 | Kilgard et al. | 345/423 |
| 6,708,168 B2 | 3/2004 | Evans | 707/6 |
| 6,948,056 B1* | 9/2005 | Roth et al. | 712/300 |
| 2004/0215768 A1* | 10/2004 | Beaumont | 708/207 |

* cited by examiner

*Primary Examiner*—Kenneth S. Kim
(74) *Attorney, Agent, or Firm*—Fish & Richardson P.C.

(57) ABSTRACT

A method of locating a target value includes loading the target value into elements of a first register. The first register includes N elements (N>0). The method also includes indicating in elements of a second register, which includes N elements corresponding to the first register, whether a corresponding element from data storage matches a corresponding element of the first register.

22 Claims, 7 Drawing Sheets

MIN/MAX VALUE VALIDATION BY REPEATED PARALLEL COMPARISON OF THE VALUE WITH MULTIPLE ELEMENTS OF A SET OF DATA ELEMENTS

CROSS-REFERENCE TO RELATED APPLICATIONS

This application is a continuation application of and claims priority to U.S. patent application Ser. No. 10/426,052, filed Apr. 28, 2003 now abandoned.

TECHNICAL FIELD

This disclosure relates to analyzing data in data storage.

BACKGROUND

Software code may contain instructions to locate specific data in data storage (e.g., memory such as volatile memory, and non-volatile memory, and the like). For example, software code may include instructions to search for a value in memory and to specify its location. Typically, this is accomplished by comparing each value in the data storage to the value to be searched until the location containing the value is determined. For example, typical instructions to locate a value, VALUE, in an array, x, having N elements are:

```
1    pos = -1
2    for (i = 0; i < N; i++) {
3        if (x[i] == VALUE) {
4            pos = i
5            break;
6        }
7    }
```

Other software code may contain instructions to validate extrema values such as a maximum value or a minimum value in the data storage. For example, typical instructions to verify a maximum value, MAX, in an array, y, having N elements are:

```
1    MAX = -1
2    for (i = 0; i < N; i++) {
3        if (y[i] > MAX) {
4            MAX = y[i]
5        }
6    }
```

Each element in the array, y, is compared to the value, MAX, one at a time.

DESCRIPTION

Figure 1:
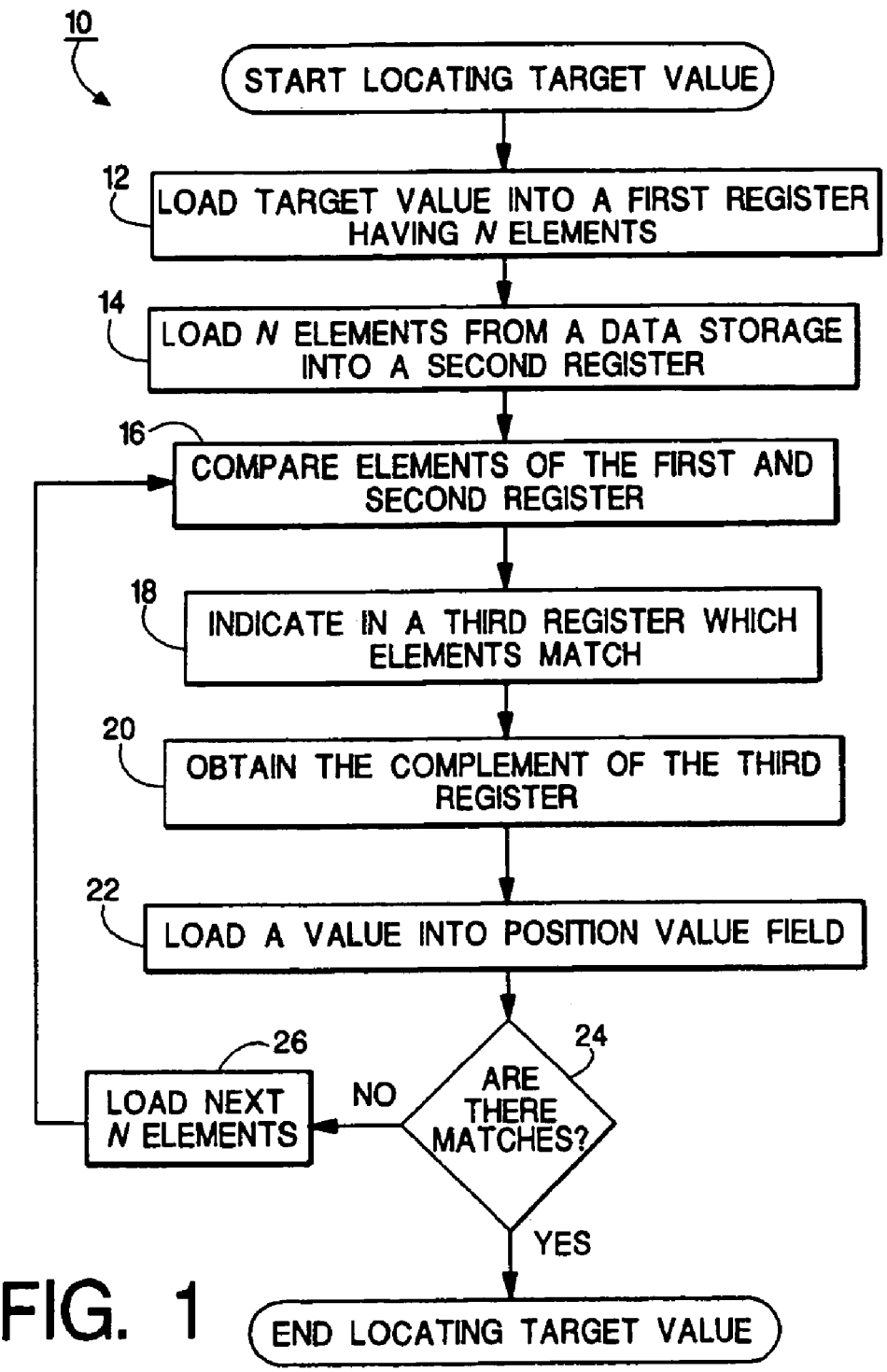
FIG. 1 is a flowchart of a process for locating a value in data storage.
Figure 2:
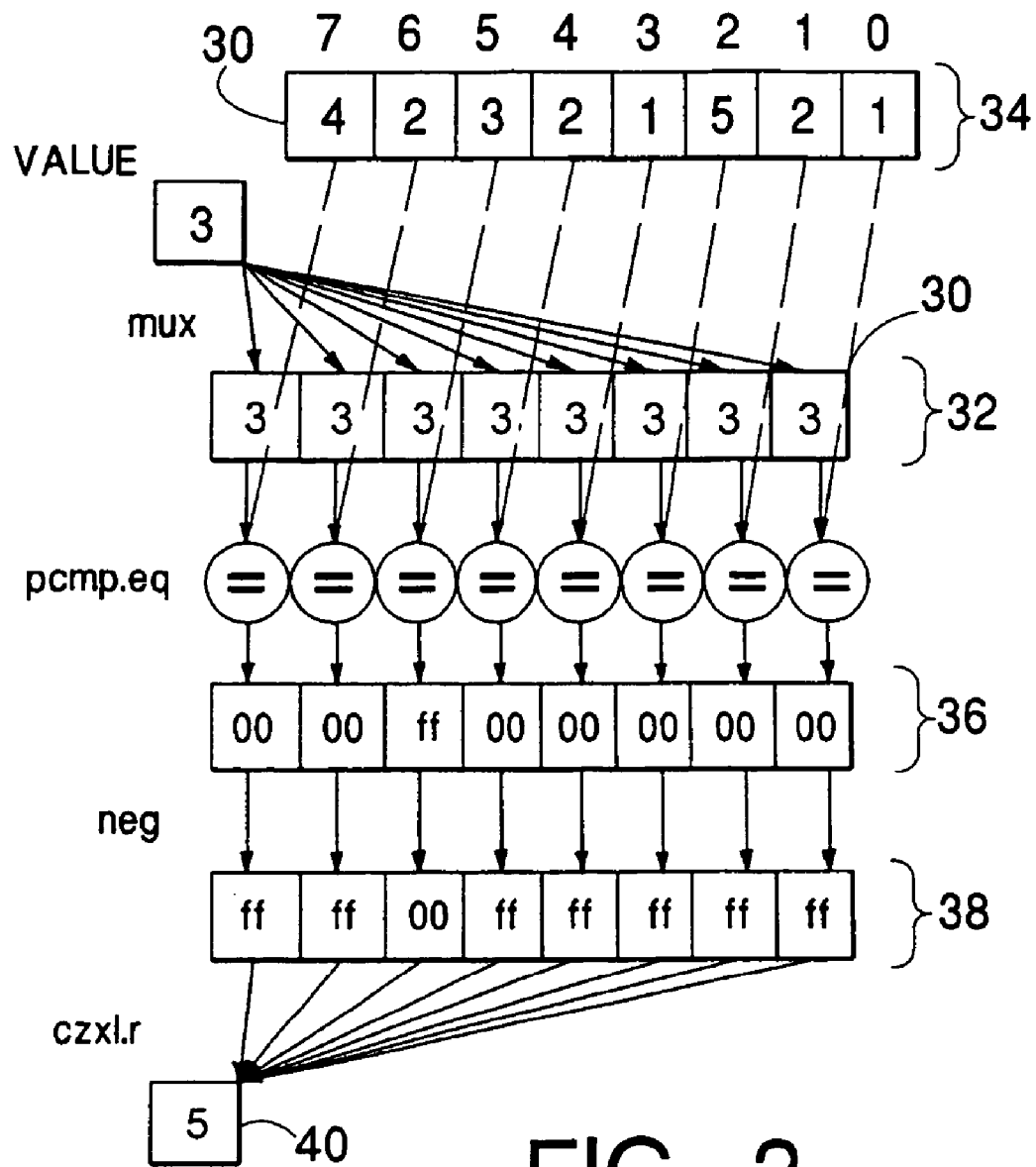
FIG. 2 is a diagram of registers used in locating the target value in the data storage.

Referring to FIGS. 1 and 2, a process 10 may be used to locate a target value in a data storage location (not shown). Instead of comparing each value in an element within the data storage location one-at-a-time with the target value, process 10 searches for the target value N elements-at-a-time (N>0) and as will be described below process 10 saves processing time. Each element, for example, may include 8-bits or 16-bits. The target value may be a value required and requested during the execution of a program (e.g., from a compiler), an arbitrary value, or a user chosen value.

Process 10 may load (12) the target value into each element 30 of a first register 32 having N (N>0) elements. For example, each element may be 8 bits and a target value of 3 may be loaded into 8 elements of first register 32, a 64-bit register. In one embodiment, process 10 may load (12) the target value using a single computer instruction (e.g., in this embodiment, mux).

Process 10 may load (14) the first N elements of the storage location into a second register 34. This can be done, for example, using one 8-byte load or eight 8-bit loads.

Process 10 may compare (16) each element of first register 32 with its corresponding element in second register 34. Process 10 may indicate (18) which elements match the target value by placing a nonzero value into a corresponding element of a third register 36. Process 10 may place a zero value into the corresponding value of the third register if there is no match. With eight one-byte values, the corresponding elements of third register 36 may be set to hexadecimal value 0xff to indicate a match and 0x00 to indicate no match. In one embodiment, process 10 compares (16) and indicates (18) using a single computer instruction (e.g., in this embodiment, pcmp.eq).

Process 10 may obtain (20) the complement of third register 36 and place resulting corresponding values into a fourth register 38. In one embodiment, process 10 obtains (20) the complement using a single computer instruction (e.g., in this embodiment, negate). In other embodiments, (20) may be skipped.

Process 10 may load (22) a value into a position field 40 indicating if and where there is an element in fourth register 38 having a zero value. A value from "0" to "N−1" may be loaded into a position field 40 to indicate a match and the position (described below) of the element having the matching value. A value of "N" may be loaded into position field 40 to indicate no match.

Each register (first register 32, second register 34, third register 36, and fourth register 38) stores values in a little-endian format, i.e., the least-significant ("right-most") element is the least significant. Thus, in second register 34, the least significant element has a value of "1" and the most significant element has a value of "4." The least significant value has a position value of "0" and the most significant value has a position value of "7." In FIG. 2, the position value of the element of fourth register 38 containing a zero value is position value "5." Thus, a value of "5" is placed in position field 40.

If more than one zero value is in fourth register 38, process 10 may load (22) into position field 40 the position value of the least significant element in fourth register 38 having a zero value.

In one embodiment, process may load (22) a position field value using a single computer instruction (e.g., in this embodiment, czx1.r).

Process 10 may determine (24) if there is a match by reading position value 40. If there are no matches (i.e., a value of "N" in field 40, e.g., a value of "8" when there are eight elements), process 10 may load (26) the next N elements (following the first N elements) of the data storage location into second register 34, and process 10 may compare (16) each field of the second register with first register 32, as above.

If there are matches (e.g., a value from "0" to "N−1" is placed in field 40), process 10 ends.

A representative example of program code (i.e., machine-executable instructions) for an INTEL® ITANIUM® processor to implement process 10 is as follows:

```
 1     mov     rA = addr of the 1st element of x
 2     mov     RPOS = 0
 3     mux1    RVAL = VAL, @bcst
 4 L:
 5     ld8     RCONT = [rA], 8 ;; //Post-increment by 8 bytes
 6     pcmp1.eq  RRES = RVAL, RCONT ;;
 7     negate NR=RRES ;; //Using e.g.xor NR=0xffffffffffffffff, RRES
 8          czx1.r  RIND=NR;;
 9          cmp.eq p2, p3=RIND, 8;;
10 (p3) br.cond  out
11 (p2)     addRPOS=8, RPOS    //Increment RPOS by 8
12          br. Cloop L;;
13 out:
14    //If RIND is different from 8, the value was found
15    //Then, its position pos in array x equals RPOS+RIND
```

In the above code, "RVAL" corresponds to first register 32, "RCONT" corresponds to second register 34, "RRES" corresponds to third register 36, "NR" corresponds to fourth register 38, and "RIND" corresponds to position field 40. Of course, other code (or even hardware) may be used to implement process 10.

Figure 3:
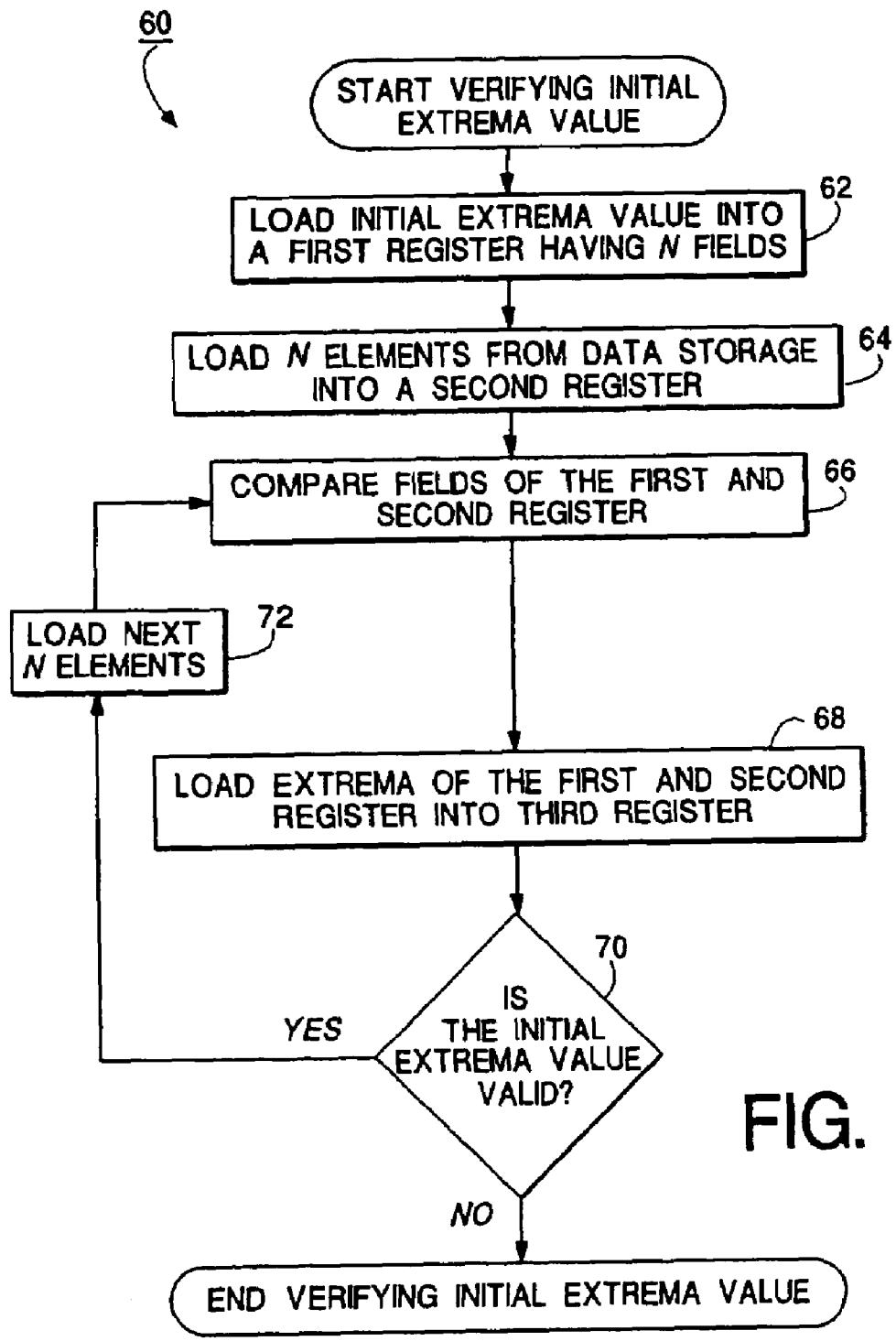
FIG. 3 is a flow chart of a process for verifying an initial extrema value in the data storage.
Figure 4:
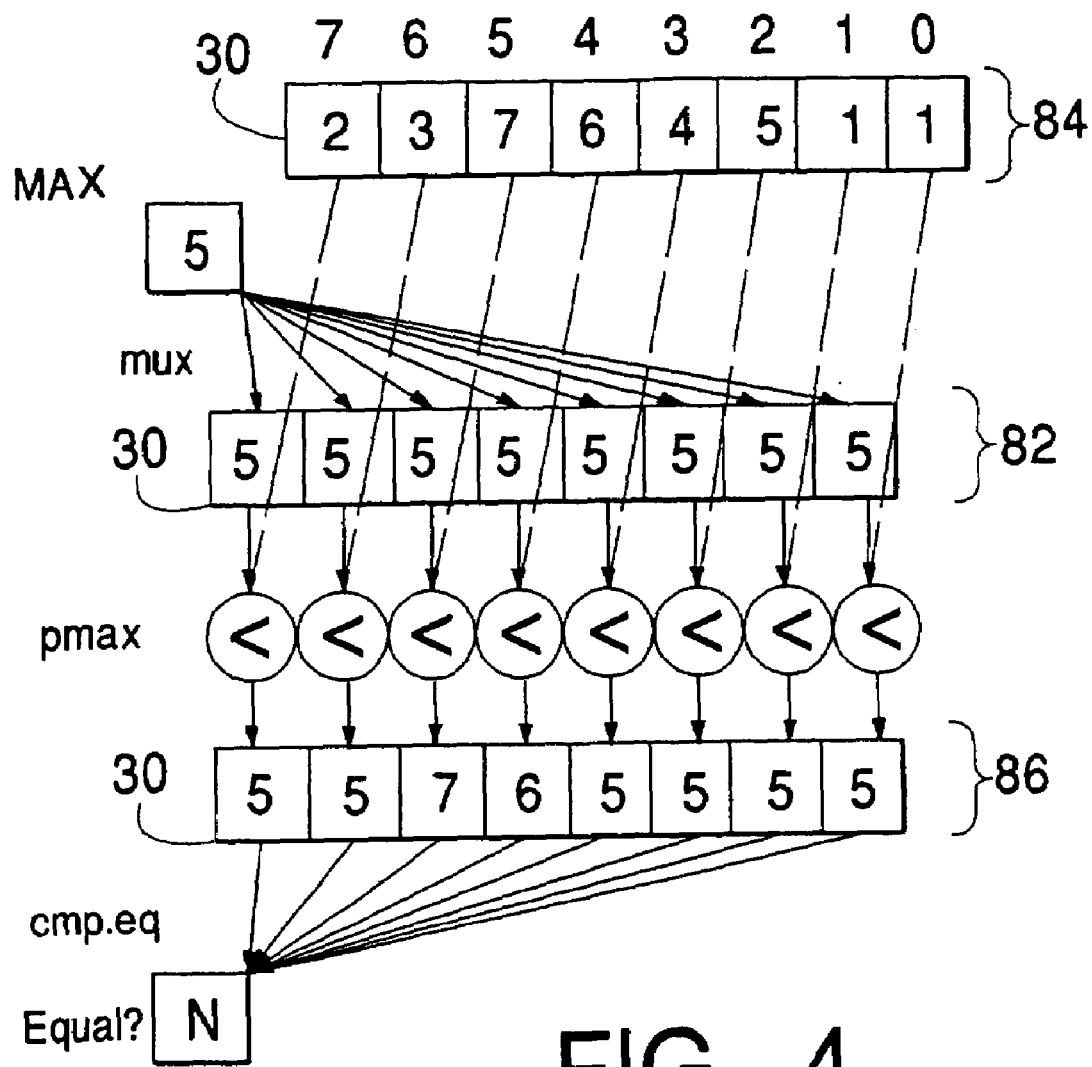
FIG. 4 is a diagram of registers used in verifying the initial extrema value for nonnegative integer values in the data storage.

Referring now to FIGS. 3 and 4, another process is shown for validating extrema values. In more detail, a process 60 (FIG. 3) searches data storage and verifies that an initial extrema value, such as a maximum value or a minimum value, is valid. Process 60 may load (62) an initial extrema value into each element of a first register 82 having N (N>0) elements, e.g., eight elements (FIG. 4). In one embodiment, process 60 may load (62) an initial extrema value using a single computer instruction (e.g., in this embodiment, mux).

The initial extrema value is a guess of the actual extrema value for the data storage. Process 60 may be used to determine if that guess is correct. The initial extrema value can come from a user input or the initial extrema value can be determined by a compiler via a compiler optimization setting. For example, a compiler, prior to executing process 60, may read the first 10% of the values in the data storage and may take the extrema from those values. The compiler may then process the remaining 90% of the data storage elements using process 60.

Process 60 may load (64) N (N>0) elements from the data storage into a second register 84. Process 60 may compare (66) each element's value in second register 84 to the initial extrema value loaded in first register 82. Process 60 may load (68) the extrema value between the first register and the second register into third register 86. For example, if the initial extrema value is a maximum, the larger of the first register element and the second register element is placed in a corresponding third register element. If the initial extrema value is a minimum, the smaller of the first register element and the second register element is placed in a corresponding third register element.

In one embodiment, process 60 compares (66) and loads (68) third register 86 using a computer instruction (e.g., in this embodiment, pmax) if the initial extrema value is a maximum and another computer instruction (e.g., in this embodiment, pmin) is used if the initial extrema value is a minimum.

Process 60 may determine (70) if the initial extrema value is valid by comparing elements from third register 86 to the initial extrema value. If all values match the initial extrema value, then the initial extrema value is valid. If at least one value in the third register does not match the initial extrema value, the initial extrema value is invalid.

If the initial extrema value is valid, process 60 may load (72) the next N (N>0) elements into second register 84. If the initial extrema value is invalid, process 60 ends.

A representative example of program code (i.e., machine-executable instructions) for an INTEL® ITANIUM® processor to implement process 60 is as follows:

```
 1    //Process first elements using method in prior art
 2    //At this point, MAX contains the local maximum
 3    //rA = addr of the 1st element of x on which this method is applied
 4    mux1    RMAX = MAX, @bcst
 5 L:
 7    ld8     RVAL = [rA], 8 ;; //8values are loaded in one step
 8    pmax1.u   RRES = RVAL, RMAX;;
 9    cmp.eq  p2,p3=RRES,RMAX;; //Are all values in RVAL lower than or equal to MAX?
10(p3) br.cond method_of_prior_art //No. Branch to recovery
11(p2) br.cond L;; //Yes. Process 60 can proceed.
```

In the above code, "RMAX" corresponds to first register 82, "RVAL" corresponds to second register 84 and "RRES" corresponds to third register 86. The code can be pipelined with an initiation interval of one using the following br.ctop instruction:

```
1 L:
2 (p16) ld8 r32 = [rA], 8 // r32 serves a RVAL3
3 (p17) pmax1.u r34 = r33, RMAX // r32 rotated into r33. r34 serves as RRES
4 (p19) cmp.eq  p2, p3 = r36, RMAX //r34 rotated into r36
5 (p3) br.cond   method_of_prior_art
6 (p2) br.ctop   L ;;
```

Of course, other code (or even hardware) may be used to implement process 60.

Heretofore, comparing each element one-at-a-time to validate an initial extrema value took N (N>0) cycles plus a fixed amount of time (e.g., time to load instructions, etc.), assuming the processing is pipelined with an initiation interval of one. For an array x having N elements, assuming that the values are stored using 8 bits per element, assuming process 60 is applied to the last f*N (0<f<1) elements of the data storage where f is the portion of the data storage analyzed by a compiler before executing process 60 and assuming the maximum value was in the first (1−f)*N elements, then process 60 takes:

(1−f)*N+f*N/8+a cycles;

where a is a constant. Assuming that N is sufficiently large, process 60 takes 7f/8 cycles.

Figure 5:
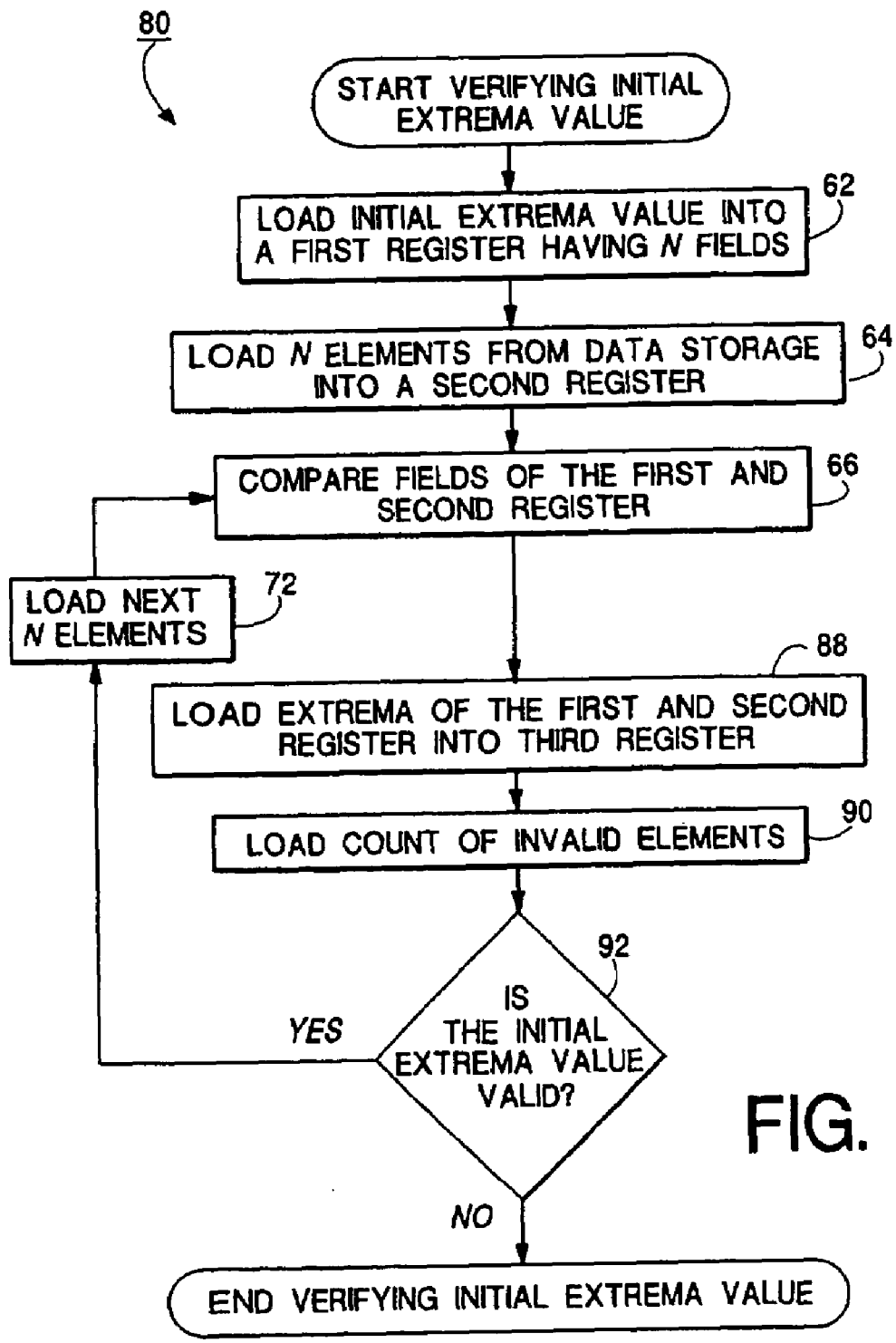
FIG. 5 is a flow chart of a process for verifying an initial maximum value for negative integer values in the data storage.
Figure 6:
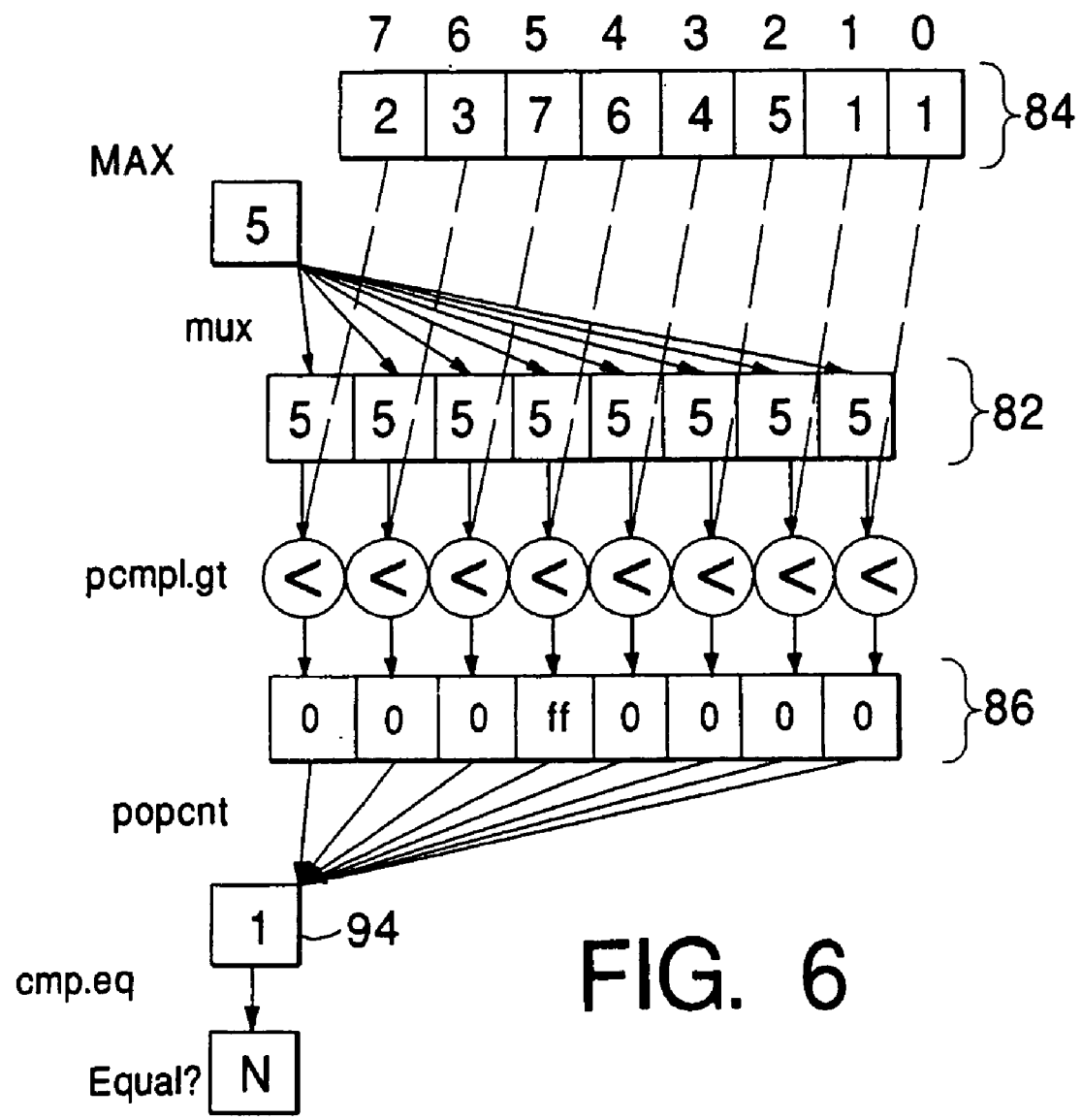
FIG. 6 is a diagram of registers used in verifying the initial maximum value for negative integer values in the data storage.

Referring to FIGS. 5 and 6, other embodiments process values in data storage that may be negative integers instead of nonnegative integers. Process 60 may be modified into a process 80 to account for nonnegative integers.

Actions 62, 64 and 66 in process 80 (FIG. 5) are the same as actions 62, 64 and 66 of process 60 (FIG. 3).

For each element in which an initial extrema is false, process 80 may load (88) a hexadecimal value of 0xff in the corresponding element of a third register 86. For each element in which the initial extrema is true, process 80 may load (88) a hexadecimal value of 0x00 into the corresponding element of third register 86. If the initial extrema value is a maximum, process 80 may determine that the initial extrema value is valid if values in first register 82 are greater than or equal to values in second register 84. If the extrema value is a minimum, process 80 determines that the initial extrema value is valid if values in first register 82 are less than or equal to the values in second register 84. In one embodiment, process 80 may compare (88) the values using a single computer instruction (e.g., in this embodiment, pcmp1.gt).

Process 80 may load (90) into an invalid count field 94 a count of the elements in third register 86 where the initial extrema value is invalid (i.e., elements having a hexadecimal value of 0xff). In one embodiment, process 80 may load (90) invalid count field 94 by using a single computer instruction (e.g., in this embodiment, popcnt).

Process 80 may determine (92) if the initial extrema value is invalid by determining if there is a nonzero value in invalid count field 94.

If the initial extrema value is valid (i.e., a zero value in invalid count field 94), process 80 may load (72) the next N (N>0) elements into second register 84. If the initial extrema value is invalid (i.e., invalid count field 94 contains a nonzero value), process 80 ends.

A representative example of program code (i.e., machine-executable instructions) for an INTEL® ITANIUM® processor to implement process 80 is as follows:

```
1     RA = addr of the 1st element of x on which process
80 is applied
2     mux1         RMAX = MAX, @bcst
3 L:
4     ld8          RVAL = [rA], 8;;
5     pcmp1.gt     RRES = RVAL, RMAX ;;
6     cmp.eq       p2, p3=RCNT, 0;;
7 (p3) br.cond    method_of_prior_art
8 (p2)    br.cond    L;;
```

In the above code, "RMAX" corresponds to first register 82, "RVAL" corresponds to second register 84, "RRES" corresponds to third register 86 and "RCNT" corresponds to invalid count field 94. The instruction above can be pipelined with an initiation interval of one and described as:

```
1 L:
2 (p16)  ld8        RVAL = [rA], 8 ;;
3 (p17)  pcmp1.gt   RRES = RVAL, RMAX ;;
4 (p19)  popcnt          RCNT = RRES;;
5 (p21)   cmp.eq         p2, p3=RCNT, 0;;
6  (p3)    br.cond     method_of_prior_art
7  (p2)    br.ctop     L ;;
```

Of course, other code (or even hardware) may be used to implement process 80.

Figure 7:
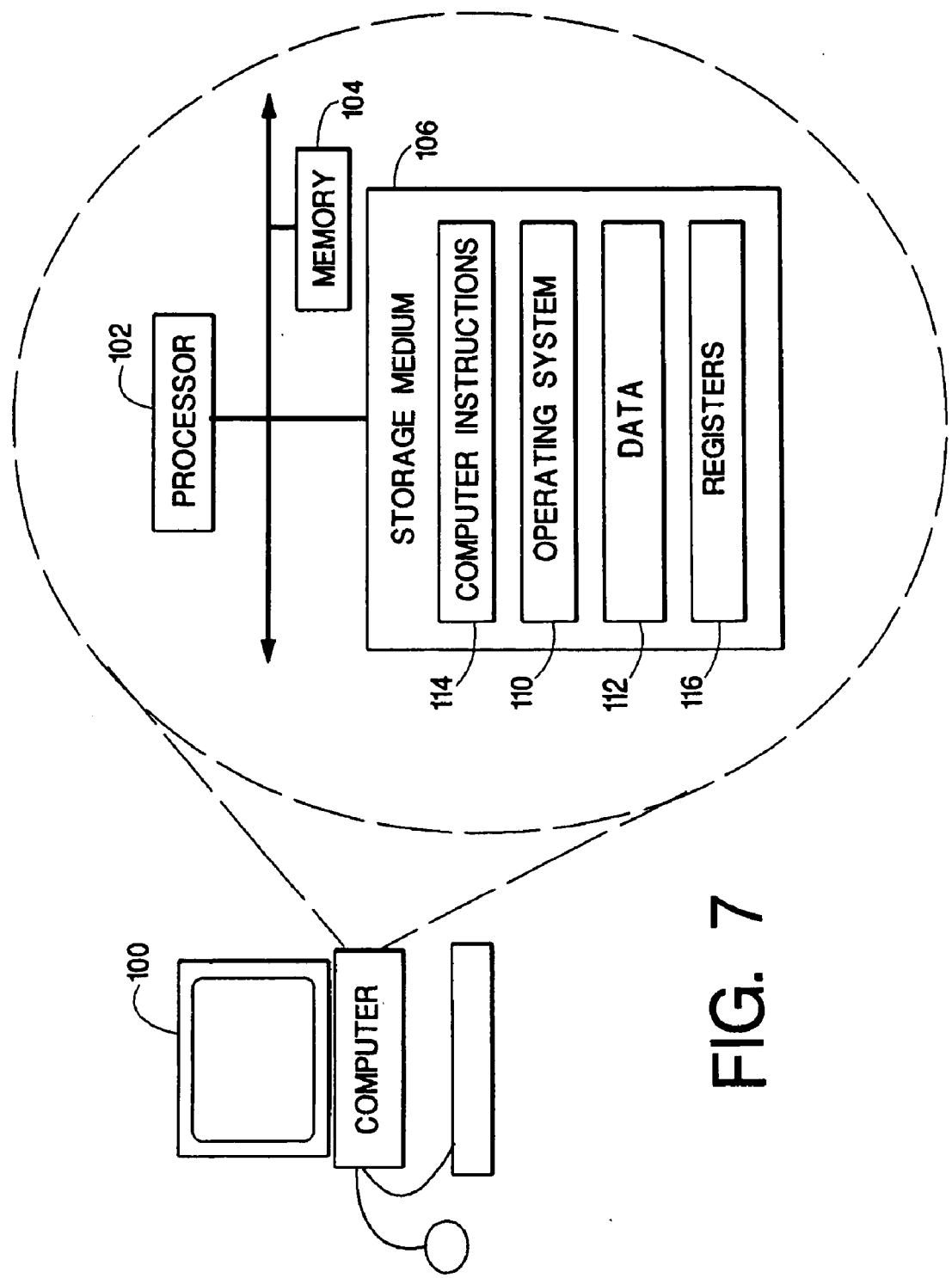
FIG. 7 is a block diagram of a computer system on which the processes of FIGS. 1 and 3 may be implemented.

FIG. 7 shows a computer 100 for using processes 10, 60 and 80. Computer 100 includes a processor 102, a memory 104, and a storage medium 106 (e.g., hard disk). Storage medium 106 stores operating system 110, data storage 112 and registers 116, and computer instructions 114 which are executed by processor 102 out of memory 104 to perform processes 10, 60 and 80.

Processes 10, 60 and 80 are not limited to use with the hardware and software of FIG. 7; they may find applicability in any computing or processing environment and with any type of machine that is capable of running a computer program. Processes 10, 60 and 80 may be implemented in hardware, software, or a combination of the two. For example, processes 10, 60 and 80 may be implemented in a circuit that includes one or a combination of a processor, a memory, programmable logic and logic gates. Processes 10, 60 and 80 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processes 10, 60 and 80 and to generate output information.

Each such program may be implemented in a high level procedural or object-oriented programming language to communicate with a computer system. However, the programs can be implemented in assembly or machine language. The language may be a compiled or an interpreted language. Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 10, 60 and 80. Processes 10, 60 and 80 may also be implemented as one or more machine-readable storage media, configured with a computer program(s), where upon execution, instructions in the computer program(s) cause a computer to operate in accordance with processes 10, 60 and 80.

Processes 10, 60 and 80 are not limited to the specific embodiments described herein. For example, the elements are not limited to 8-bit or 16-bit, nor are the registers limited to 64 bits. Rather, the elements and registers can be any combination of sizes that are consistent with the processes described herein.

In another example, processes 60 and 80 are not limited to the actions described herein. For example, after determining that an extrema value is invalid by another value in the data storage, processes 60 and 80 can overwrite the elements of the first register with a new extrema value and continue processes 60 and 80 with the rest of the data storage elements.

In still another example, overwriting the registers with the new values may reduce the number of registers used to execute processes 10, 60 and 80.

Processes 10, 60 and 80 are not limited to the specific processing order of FIGS. 1, 3 and 5. Rather, the blocks of FIGS. 1, 3 and 5 may be re-ordered, as necessary, to achieve the results set forth above.

Other embodiments not described herein are also within the scope of the following claims.

What is claimed is:

1. A method of verifying if an initial extrema value is valid as one of a maximum and a minimum, comprising:
    loading the initial extrema value into N elements of a first register, wherein N>1;
    comparing the initial extrema value in the elements of the first register with contents of a first set of N elements of a data storage;
    loading, into N elements of a second register, the extremae of the contents in the N elements of the data storage and the initial extrema value in the elements of the first register;
    determining if the initial extrema value is valid based on contents of the N elements of the second register; and
    in response to determining that the initial extrema value is valid, comparing the initial extrema value with contents of a second set of elements of the data storage and loading, into the N elements of the second register, the extremae of the contents in the N elements of the data storage and the initial extrema value in the elements of the first register.

2. The method of claim 1, further comprising indicating whether an initial extrema value is invalid.

3. The method of claim 2, wherein:
    the extrema value comprises a maximum; and
    comparing comprises determining if the content of an element of the data storage is greater than the initial extrema value.

4. The method of claim 1, wherein the initial extrema value is determined by a user.

5. The method of claim 1, wherein the initial extrema value is determined by a compiler.

6. The method of claim 1, wherein loading the initial extrema value comprises loading the initial extrema value into N elements in a single computer instruction.

7. The method of claim 1, further comprising comparing the initial extrema value to the contents of N elements of the second register to determine if the initial extrema value is valid.

8. An apparatus for verifying if an initial extrema value is valid as one of a maximum and a minimum, the apparatus comprising:
    circuitry, configured to:
        load an initial extrema value into N elements of a first register, wherein N>1,
        load, into an N element second register, the extremae of the contents of a first set of N corresponding elements in a data storage and the initial extrema value in the N elements of the first register,
        determine if the initial extrema value is valid based on the contents of the second register; and
        in response to determining that the initial extrema value is valid, load, into the N element second register, the extremae of the contents of a second set of N corresponding elements in the data storage and the initial extrema value in the N elements of the first register.

9. The apparatus of claim 8, further comprising circuitry to indicate whether the initial extrema value is invalid.

10. The apparatus of claim 9, wherein:
    the extrema value comprises a maximum; and
    the circuitry is configured to indicate the extremae by determining if the content of an element in the data storage is greater than the initial extrema value.

11. The apparatus of claim 8, wherein the initial extrema value is determined by a user.

12. The apparatus of claim 8, wherein the initial extrema value is determined by a compiler.

13. An article comprising a machine-readable medium that stores executable instructions, the instructions operable to cause a machine to perform operations for verifying if an initial extrema value is valid as one of a maximum and a minimum, the operations comprising:
    loading the initial extrema value into N elements of a first register, wherein N>1; and
    loading, into an N element second register, the extremae of the contents of a first set of N corresponding elements in a data storage and the initial extrema value in the N elements of the first register;
    determining if the initial extrema value is valid based on the contents of the second register; and
    in response to determining that the initial extrema value is valid, loading, into the N element second register, the extremae of the contents of a second set of N corresponding elements in the data storage and the initial extrema value in the N elements of the first register.

14. The article of claim 13, further comprising instructions causing a machine to indicate whether the initial extrema value is invalid.

15. The article of claim 14, wherein:
    the extrema value comprises a maximum; and
    the operations further comprise determining if an element in the second register is greater than the initial extrema value.

16. The article of claim 13, wherein the initial extrema value is determined by a user.

17. The article of claim 13, wherein the initial extrema value is determined by a compiler.

18. A system for verifying if an initial extrema value is valid as one of a maximum and a minimum, the system comprising:
    at least one processor;
    a memory; and
    logic coupled to the processing device and the memory, usable by the at least one processor to:
        load a target value into N elements of a first register, wherein N>1,
        indicate in an element of a second register whether content of a corresponding element from a data storage matches the target value in an element of the first register,
        load an initial extrema value into M elements of a third register, wherein M>1,
        load, into an M element fourth register, the extremae of the contents of a first set of M corresponding elements in a data storage and the initial extrema value in the M elements of the third register,
        determine if the initial extrema value is valid based on the contents of the third register, and
        in response to determining that the initial extrema value is valid, load, into the M element fourth register, the extremae of the contents of a second set of M corresponding elements in the data storage and the initial extrema value in the M elements of the third register.

19. The system of claim 18, wherein:

the first register is the third register; and the second register is the fourth register.

20. The system of claim 18, further comprising logic to indicate a position of at least one element in the data storage containing the target value based on the contents of the second register.

21. The system of claim 18, further comprising logic to indicate whether an initial extrema value is invalid.

22. A method for verifying if an initial extrema value is valid as one of a maximum and a minimum, the method comprising:

loading an initial extrema value into N elements of a first register, wherein N>1;

loading a first set of contents of a data storage into N elements of a second register;

comparing, in a single computer instruction, the initial extrema value in the N elements of the first register with the contents in the N elements of the second register;

loading results of the comparison into N elements of a third register;

determining if the initial extrema value is valid based on the results of the comparison in the third register; and in response to determining that the initial extrema value is valid, loading a second set of contents of the data storage into the second register, comparing the initial extrema value in the N elements of the first register with the contents of the second register, and loading results of the comparison into the third register.

* * * * *